331-98

SEARCH ROOM

Aug. 29, 1950 E. A. JOHNSON 2,520,148

ULTRA HIGH FREQUENCY APPARATUS

Filed May 31, 1945 2 Sheets-Sheet 1

Inventor
EDWIN A. JOHNSON

By Ralph L. Chappell
Attorney

Aug. 29, 1950 E. A. JOHNSON 2,520,148

ULTRA HIGH FREQUENCY APPARATUS

Filed May 31, 1945 2 Sheets-Sheet 2

Inventor
EDWIN A. JOHNSON

By Ralph L. Chappel
Attorney

Patented Aug. 29, 1950 2,520,148

UNITED STATES PATENT OFFICE 2,520,148

ULTRA HIGH FREQUENCY APPARATUS

Edwin A. Johnson, Washington, D. C.

Application May 31, 1945, Serial No. 596,932

14 Claims. (Cl. 315—39)

(Granted under the act of March 3, 1883, as amended April 30, 1928; 370 O. G. 757)

This invention relates to high frequency radio apparatus and in particular to tuned high frequency resonator cavity tank circuits. The invention is useful in its application to resonant circuits in such apparatus as oscillation generators, tuned radio frequency amplifiers, frequency converters and detectors, although not limited thereto.

One of the objects of the present invention is to provide a highly efficient tuned oscillatory circuit of the cavity resonator type construction which is devoid of sliding elements for tuning purposes and wherein tuning is accomplished solely by a single-control tuning means.

Another object of the invention is the provision of a concentric hollow conductor resonator assembly within an enclosed container wherein there is provided two cooperating cavities each of fixed dimensions and forming a single tuned resonant circuit, and in which tuning of this resonator circuit is accomplished solely by use of a single tuning means effective between the cavities and confined wholly within the enclosing container.

According to one feature of the present invention, a cavity resonator circuit is provided having grid-cathode and grid-plate cavities or "tanks" of fixed dimensions and a single tuning capacitor within the anode resonator cavity and connected between the grid cavity and the plate tank operable by a single tuning control from the front panel of the cabinet housing the equipment.

Another feature of the invention is the use of a single resonant tuned circuit of the cavity resonator type tuned by a single tuning capacitor of the rotary type which is arranged entirely within one of the hollow conductors forming part of the resonator circuit.

A further feature of the invention is the use of open windows or wide apertures cut out of the sides of the grid pedestal or tank forming unit for feedback coupling between the grid and anode cavities instead of utilizing a feedback coupling loop as is commonly employed in the prior art resonator cavity circuit constructions.

Other objects, features and advantages of the invention will be apparent from the following description of particular embodiments thereof made with reference to the accompanying drawings, in which.

Figure 1:
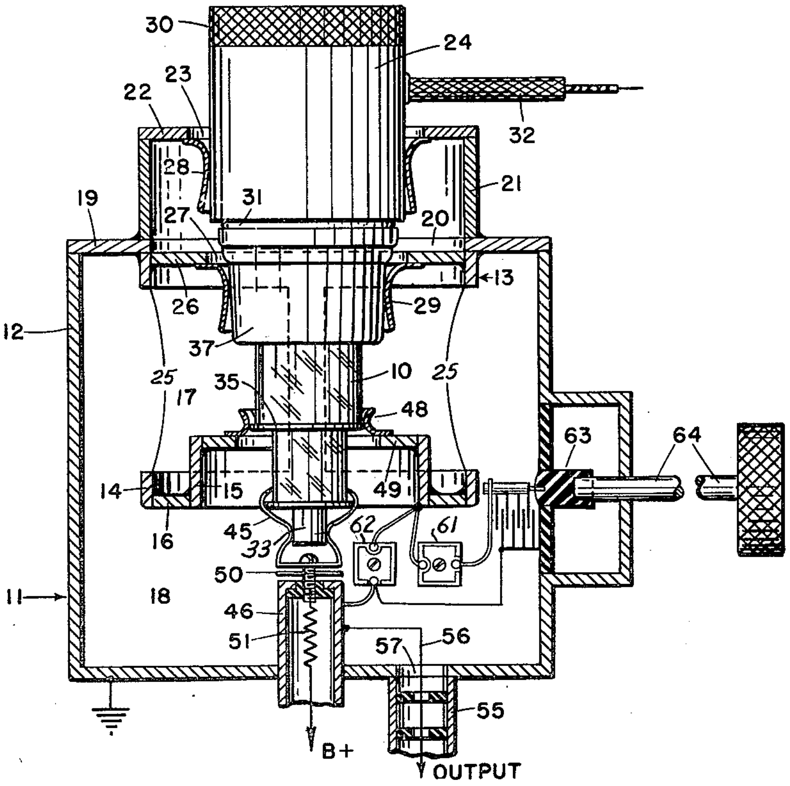
Fig. 1 is a longitudinal sectional view of a compact resonator cavity oscillator constructed in accordance with the principles of the invention.
Figures 3, 4, 5, 6:
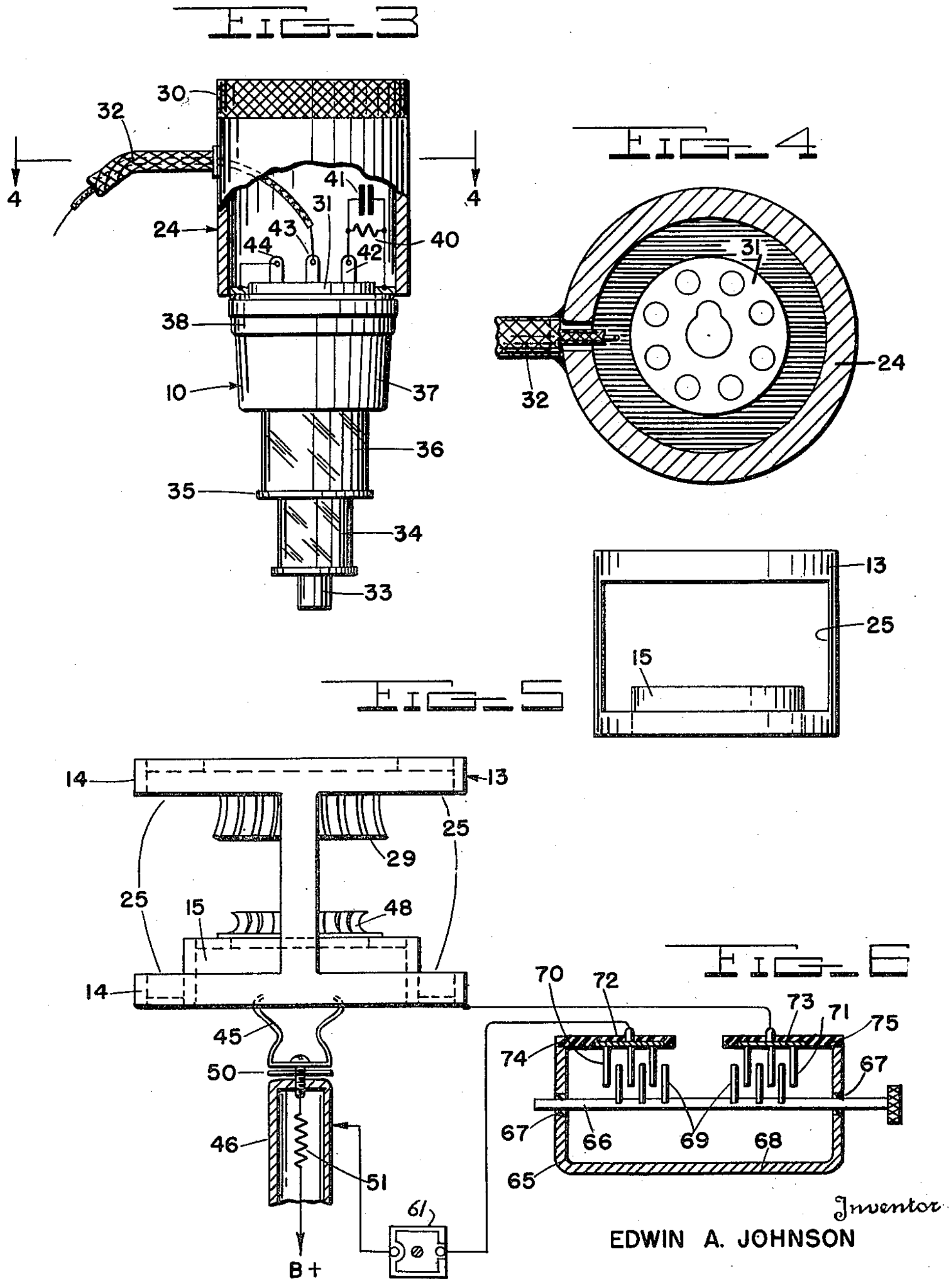
Fig. 3 is a diagrammatic view, partly in section, of the removable closure plug member carrying the oscillator tube.
Fig. 4 is an enlarged cross-sectional view of the closure plug shown in Fig. 3, taken substantially on line 4—4 thereof.

Fig. 5 is a side elevation, on smaller scale, of the grid resonator "tank" or pedestal unit employed in the Fig. 1 oscillator arrangement and forming the inner hollow partition means thereof but in the present representation being shown with the ring connectors to the "lighthouse" tube terminal connectors omitted; and Fig. 6 is a modified form of the invention in which the grid resonator "tank" or pedestal unit of the construction shown in the Fig. 1 oscillator arrangement is utilized in conjunction with a split-stator type of tuning condenser means which may be employed in accordance with this invention.

Figure 2:
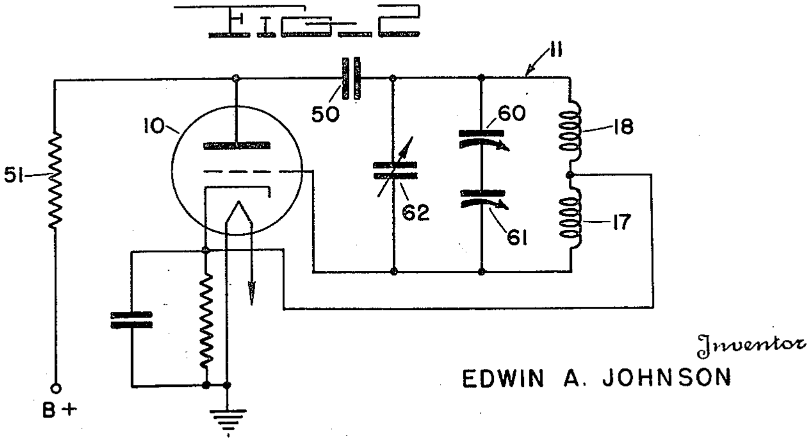
Fig. 2 shows the equivalent electrical circuit of the oscillator system of Fig. 1.

Referring to Figs. 1 and 2 there is shown as one embodiment of this invention a high frequency oscillator comprising a high frequency electronic device or oscillator tube 10 operatively connected in a tuned oscillatory circuit 11 of the concentric cavity resonator type which is in effect a grounded-cathode oscillator circuit having the schematic diagram circuit shown in Fig. 2.

The concentric resonator cavity tank circuit or tuner 11 for controlling the frequency of oscillation generated by the oscillator comprises an outer hollow conductive receptacle or metallic box-like container 12, which for the purposes of illustration is shown as being of generally cubical shape, with an enclosing metallic wall and metallic end members defining a substantially enclosed container. Concentrically arranged inside of the container 12 and in suspended relation from one metallic end member thereof is a hollow conductive partition means in the form of a concentric hollow-conductor assembly 13, hereinafter called a "pedestal" unit, which divides the interior of the container 12 into two compartments or resonator cavities each capable of resonance at the same frequency, the inner compartment forming the cathode-grid resonator tank circuit. Briefly, the "pedestal" unit 13 comprises two concentric spaced coaxial hollow metallic conductors or tubular members 14 and 15 of different lengths which are mechanically and electrically connected together at one end by an annular metallic end member 16, a more detailed description of this assembly being set forth hereinafter as the specification proceeds. The space between the outer tubular conductor 14 and the oscillator tube 10, when the latter is in operating position, forms the cathode-grid cavity 17 of the device while the space between the outer conductor 14 and the enclosing walls of the container 12 forms the anode or plate cavity 18 of the oscillator. In connection with the Fig. 1 arrangement, hollow conductive members having cross-sections other than circular such as, for example, rectangular cross-sections may be used for all conductors 12, 14 and 15 but it is preferable to use circular cross-sections for the interior conductors 14 and 15 as this will result in the most uniform current distribution at the surfaces of these conductors, and to use a square cross-section for the outer receptacle or container 12 as this contour will facilitate mounting of the internal tuning and trimming condensers and, in addition, provide a highly compact assembly where space requirements impose restricted dimensional limitations on the arrangement of the device.

The conductors 12, 14 and 15 shown in Fig. 1 each are of a length such that their inherent inductance, together with capacitance existing between them, will be resonant to a desired operating frequency. This will be found to be, because of the capacity between the conductors, equal to a physical length of the grid resonator "pedestal" unit 13 somewhat less than $\lambda/4$ at the desired operating frequency. As shown in Fig. 1, the outer container 12 is of generally cubical or rectangular box-like formation having substantially flat or planar sides and ends one of said ends forming a closed bottom and the other end forming the top wall 19 of the container 12. The top 19 is provided with a circular aperture 20 which preferably is centrally located and communicates with the bore of a short upstanding sleeve-like member 21 which in turn has a top 22 also provided with a center circular aperture 23 through which can be readily introduced and removably accommodated an insertible closure plug 24 which demountably carries the oscillator tube 10, as will be hereinafter described in great er detail.

As thus described, the "pedestal" unit or partition member 13 is formed of an outer hollow cylindrical or tubular conductor 14 within the lower end portion of which is concentrically arranged the relatively short inner hollow cylindrical or tubular conductor 15. This hollow-conductor assembly 13 is suspended from the top wall 19 of the container 12 and fixedly secured to the underside of the wall 19 as by soldering, brazing or welded thereto. When thus mounted, the "pedestal" unit 13 forms in effect a partition within and concentric with the container and extends longitudinally throughout the major portion thereof with the lower end disc member 16 terminating in a plane substantially well-spaced from the bottom of the container 12.

As shown in Figs. 1, 5, and 6, the inner conductor 15 extends inwardly and upwardly from the lower end of the outer conductor 14 and is maintained in fixed coaxial relationship with respect thereto by means of the annular conductive end disc 16 which is electrically connected to and closes the space between the lower ends of the tubular conductors 14 and 15 as by being suitably soldered, brazed or welded thereto. The inner conductor 15 thus defines a re-entrant hollow cylindrical rim portion within the outer conductor 14 which together in conjunction with the top, bottom and side walls of the container 12 provides an arrangement such that the compartment space 17 may be utilized as the cathode-grid resonator cavity and the compartment space 18 may be utilized as the cathode-plate resonator cavity. The re-entrant portion provided by conductor 15 permits the pedestal unit 13 to have a length greater than the separation between the base of the tube 10 and its grid terminal 35 described below, thus providing a larger grid cavity and an extension of the lower frequency limit of the oscillator. Standing waves of ultra high radio frequency energy are set up within the grid cavity 17 when this resonator space is electrically excited by means of the high frequency oscillator tube 10, hereinafter to be described in greater detail, so that these cavities will operate at a predetermined mode of oscillation. Feedback coupling between the cathode-grid resonator cavity 17 and the cathode-anode resonator cavity 18 respectively is obtained by means of wide window openings or enlarged generally rectangular longitudinal apertures 25 provided at diametrically opposite side portions in the outer tubular conductor 14.

An annular transverse member 26 which forms one end of the "pedestal" unit 13 has a center circular aperture 27 coaxially arranged with respect to the respective bores of both hollow conductors 14 and 15 forming the longitudinal partition and relative to the center aperture 23 in the top wall of the container 12. In accordance with the above arrangement, the respective bores of the hollow conductors 14 and 15 define a coaxially disposed passage leading downwardly from the circular apertures 23 and 27 and extending throughout the entire length of the outer conductor 14 for accommodating the oscillator tube 10. Adjacent to and surrounding the marginal edge portions of the center of the apertures 23 and 27 respectively are secured the resilient fingered annular electrical connectors 28 and 29.

As previously stated, the top end of the container 12 is normally closed by the removable closure plug 24 which is insertable axially into the container 12 through the center aperture 23 and secured in place by means of the resilient spring fingers of the connector ring 28 which is arranged to be substantially contiguous with the peripheral edges of the opening 23. As shown in Fig. 3 the closure plug 24 is in the form of a hollow cylinder with its top closed by a cap 30 having suitable screw-threaded connection (not shown) to the body of the plug while secured to and carried at the lower end of the plug 24 is a vacuum tube socket 31 into which is demountably secured the high frequency vacuum tube 10. Cathode heater leads and ground leads to tube socket 31 are provided by means of a conventional shielded cable 32.

The vacuum tube 10 (see Fig. 3) consists of a high frequency triode of the stepped disc-seal formation, such as a Type 446 tube, which is now known to the art and referred to as a "lighthouse" tube, having a cylindrically flanged conductive contact member or anode cap terminal 33 hermetically sealed to the top end of a tubular glass envelope portion 34, a conductive annular grid disc terminal 35 which is hermetically sealed between the top envelope portion 34 and a second tubular glass envelope portion 36 of larger diameter, and a metallic shell-like cathode terminal 37 sealed to the lower end portion of the tubular glass envelope portion 36 and an insulating base 38. The cathode shell 37 of tube 10 is generally capacitively coupled to the cathode itself by virtue of a built-in capacitance (not shown) while a direct connection to the cathode for bias purposes is also provided through a suitable base pin (not shown). Cathode bias for tube 10 may be produced for example, by way of a self-biasing circuit comprising parallel resistor 40 and capacitor 41 tied to the cathode prong 42 of the tube socket 31 which is adapted to engage the base pins of tube 10, while the filament connection may be made by way of prongs 43 and 44.

The tube 10 is axially insertible through the cathode-grid cavity 17 from the top end of the container 12 by and at the time of insertion of the closure plug 24, the tube 10 being suspended from the socket 31 into operative position with the anode cap 33 being engaged by and resiliently held by the spring fingers of the electrical connector 45 which is affixed to the upper end of a tubular anode post 46 and electrically insulated therefrom by insulator sleeve 47 and a thin mica sheet 50. The mica sheet serves as the dielectric for plate coupling condenser (.005 mmfd.) The anode post extends upwardly from the bottom of container 12, and also downwardly through the bottom of container 12. The anode post is hollow and houses the plate supply lead to connector 45 from an external source (not shown) through the plate decoupling resistor 51 (5,000 ohms). With the tube 10 thus positioned, the cathode terminal 37 engages the electrical connector 29 and the grid terminal disc 35 engages an electrical ring connector 48 secured to the annular end member 49 which closes the upper end of the inner hollow conductor 15. Electrical ring connectors 28 and 29 and 48 each are of similar construction in that each has a central opening circumferentially bounded by a plurality of angularly disposed conductive resilient contact fingers arched radially inwardly with respect to the axis of the collar and integrally connected at their lower ends to an annular conductive skirt or flanged base member.

Suitable external circuit coupling means are provided for deriving energy from the internal oscillations of the plate cavity and delivering such amplified high frequency energy to some external circuit or utilization device. By way of illustration this coupled output means is shown as comprising a coaxial line 55 the inner conductor 56 of which is electrically connected, as by soldering, to the anode post 46 within the cathode plate cavity 18 and passes in spaced or electrically insulated fashion through the aperture 57 in the bottom wall of the container 12 to the exterior thereof for electrical connection to some external device utilizing the high frequency energy of the oscillator. Another method of connecting the resonator to an output circuit comprises use of a pick-up loop (not shown) in the anode cavity 18 connected exteriorly to an external utilization circuit.

The circuit arrangement shown in Fig. 1 may be likewise used for the purpose of amplification instead of oscillation generation, merely by supplying suitably phased radio frequency energy of the fundamental frequency from an outside source to excite the resonant cavities 17 and 18 instead of using the windowed feedback arrangement herein disclosed. In other words, if no coupling is provided between the resonant members, the device of Fig. 1 will act as an amplifier of electromagnet waves at the resonant frequency of the system.

Tuning of the oscillator is effected solely by a single control knob on the front panel of the apparatus (not shown) and also by variable tuning condenser 60 (see Fig. 6) which is connected in series with a padding or trimming condenser 61 between the cathode grid and cathode plate cavities 17 and 18 respectively. A trimming or padding condenser 62 in shunt with the main tuning condenser 60 is provided for compensating for tracking variations and it is adjusted and fixed at the proper setting at which the cavities 17 and 18 resonate at the same points on the tuning dial. The tuning condenser 60 may be of the variable air dielectric type mounted wholly within the anode cavity 18, the rotor of said condenser being secured to an insulator coupling 63 which in turn is connected to and turned by the shaft 64 attached to the external control knob.

In Fig. 6 there is illustrated in a different side elevational view an embodiment of the grid cavity resonator "tank" unit which is adapted for use in the oscillator and circuit shown in Fig. 1 but wherein the condenser 60 employed may be of the split-stator type having a floating rotor. The arrangement shown in Fig. 6 employs a condenser 65 having a shaft 66 rotatably mounted in bearings 67 of insulating material in a U-shaped metallic frame 68. The rotor plates 69 of the condenser 65 are secured to the shaft 66 and may be rotated by a suitable knob with respect to the two sets of stator plates 70 and 71, each set being carried by a suitable metallic support member 72 and 73 respectively which is attached to the insulation strips 74 and 75, supported in cantilever fashion by the arms of the U-frame 68. In this embodiment the condenser 65 is mounted within the plate cavity in place of condenser 60. Because of the greater length of condenser 65 it is preferred to mount condenser 65 longitudinally adjacent to one side of the container 12 so that it will not interfere with the anode post 46.

As above described, the invention provides a new form of resonator circuit especially useful as an oscillator having a reentrant grid pedestal. In accordance with this invention there is provided a single tank circuit, i. e., one resonant circuit, instead of two separate resonant circuits as would be the case with a concentric line type of circuit. While the outer container 12 has been shown and described as being concentric with the grid cavity unit 13 this arrangement is not to be limited to such construction since it has been found that the device will operate satisfactorily if the interior hollow conductor assembly 13 is placed off-center relative to the interior of the outer container 12.

The improvements produced by the present invention enable operating the outer receptacle forming the cathode-conductor member of the resonator circuit at ground potential thereby reducing the operating hazard to personnel working with the equipment. The anode post 46 is located inside of the radio frequency field inside of the anode cavity 18. Coupling lead 56 abstracts the high frequency energy induced in the anode cavity and supplies a suitable exterior utilization circuit.

In one embodiment tried out in practice, there was obtained a frequency range in the signal generator or oscillator from about 300 megacycles to 600 megacycles. Another oscillator of this design constructed and tested was found capable of operation over the range of frequencies of substantially from 600 to 800 megacycles.

While there has been described a preferred embodiment of the invention, it will be obvious to those skilled in the art that various changes and modification may be made therein without departing from the spirit of the invention, and it is therefore, to be distinctly understood that no limitations are intended other than are imposed by the scope of the appended claims as limited by the prior art.

The invention described herein may be manufactured and used by or for the Government of the United States of America for governmental purposes without the payment of any royalty thereon or therefor.

What is claimed is:

1. A high frequency resonator device comprising a substantially enclosed container formed by an enclosing metallic wall member and metallic end members, partition means within and mounted concentrically to said container and formed of concentric outer and inner hollow conductors in spaced coaxial relation connected together at one end, said partition being supported solely at one end and dividing said container into two compartments, said outer hollow conductor being provided with apertures to afford free passage of electromagnetic wave energy between the said compartments when one of said compartments is electrically excited by high frequency electronic means operatively arranged therein.

2. A high frequency resonator device comprising a substantially enclosed container of generally cubical shape formed by an enclosing metallic wall member and metallic end members, partition means within and mounted concentrically to said container and formed of concentric outer and inner tubular conductors of different lengths in spaced coaxial relation connected together at one end, said partition being supported solely at one end and dividing said container into two compartments, said outer tubular conductor being provided with apertures for feedback coupling between the said compartments when the inner compartment is electrically excited by high frequency electronic means operatively arranged therein.

3. A high frequency resonator device comprising an outer metallic container presenting a substantially closed chamber formed by the enclosing metallic wall member and metallic end members of said container, one of said end members forming a closed bottom and the other a top having a circular aperture, partition means in said chamber formed of concentric outer and inner tubular conductors in spaced coaxial relation connected together at one end and also concentric with said aperture, said partition extending longitudinally of said chamber throughout the major portion thereof and dividing it into two compartments, said partition having enlarged apertures forming window openings at diametrically opposite side portions of the outer tubular conductor for providing feedback coupling between said two compartments.

4. An electrical resonator device comprising a substantially closed hollow metallic container, one wall member of said container being provided with a circular aperture of a size to permit introduction therethrough of a lighthouse tube into the interior of said container; a first hollow cylindrical conductor inside of said container arranged concentrically with the aperture in said wall member and secured at one end to said wall, the other end of said first hollow cylindrical conductor terminating in an annular end member in spaced opposed relation to the opposite wall member of said container, and a relatively short hollow cylindrical inner conductor in spaced coaxial relation to said first hollow cylindrical conductor and connected at one end to said annular end member, the bores of both of said hollow conductors defining an axially disposed passage leading from said circular aperture and extending through the entire length of said first hollow cylindrical conductor for accommodating a lighthouse tube, said annular end member closing the space between both conductors and in conjunction with said first hollow cylindrical conductor and said annular end member defining one of the resonant cavities of said device for excitation by a lighthouse tube when operatively connected to said conductors and housed in said passage, the other resonant cavity being formed by the space surrounding said first hollow cylindrical conductor and bounded by the walls of said container, and means associated with said first hollow cylindrical conductor arranged to provide feedback coupling between said cavities.

5. Ultra high frequency apparatus comprising a hollow generally box-like metallic container; inner and outer spaced coaxial tubular conductors of different lengths and diameters in the interior of said container, said outer tubular conductor being secured at one end to a wall member of said container and having the other end unsupported in spaced relation with respect to the opposite wall member of the container, said inner tubular conductor being of shorter length than the larger outer tube and connected at one end to the free end thereof by an annular conductive member which closes the space between the ends of said tubes; a vacuum tube of stepped formation having a cathode, an anode and a control grid with an annular terminal associated with each of said electrodes; means connecting said annular cathode terminal to the secured end portion of said outer tube, means connecting said annular grid terminal to the free end portion of said inner tube, means connecting said annular anode terminal to a source of anode potential, and means operatively connected between said outer tube and a wall of said container for tuning said resonator.

6. A high frequency resonator device comprising a hollow conductive container including a transverse wall member having a circular aperture, a concentric tubular conductor assembly in the interior of said container comprising concentric inner and outer tubular conductors of different diameters and lengths, the smaller tube being connected to the larger tube at one end and the larger tube being secured at the other end to said transverse wall member, means associated with the free end of the short inner tube for engaging the grid ring terminal of a lighthouse tube, means associated with said circular aperture of said wall member and within the adjacent end of said larger outer tube for engaging the cathode shell terminal of the lighthouse tube, and anode engaging means in said container beneath and coaxial with said tubular conductors for supplying operating potential to said lighthouse tube from an external source of anode potential, tuning means substantially wholly in said container for tuning said resonator, and output means for removing radio frequency energy from said anode chamber.

7. A high frequency cavity resonator device adapted to accommodate and be excited by a lighthouse tube, comprising a substantially closed outer receptacle provided with a metallic enclosing wall member and metallic end members, one of said end members having a circular aperture therein, an upstanding sleeve-like member mounted on the outside of said apertured end plate in concentric relation to said aperture, a hollow cylindrical closure plug removably accommodated in said upstanding member and presenting at its base a vacuum tube socket adapted to removably mount the lighthouse tube, said upstanding member having annularly mounted resilient contact fingers for engaging the cylindrical body portion of said closure plug, a hollow conductor assembly within the interior of said receptacle comprising an outer tubular conductor attached at one end to said apertured end member of said receptacle and also mounted in concentric relation to said aperture within the receptacle, said outer tubular conductor being spaced from the other end of said receptacle and provided with annularly mounted contact fingers for engaging the cathode shell of the lighthouse tube, an inner tubular conductor mounted in spaced coaxial relation inside of said outer tubular conductor and connected at one end to the unattached end of said outer tubular conductor and also mounted in concentric relation to said aperture, said inner tubular conductor being provided at its free end with annularly mounted resilient contact fingers for engaging the grid ring of said lighthouse tube, and a third metallic tubular member mounted coaxially relative to said aperture but located in the interior of said receptacle and secured to the other end member of said receptacle, said third tubular member having at its free end resilient contact fingers for engaging the anode electrode terminal of said lighthouse tube.

8. A high frequency resonant circuit comprising a conductive hollow box-like container having flat top, bottom and side wall members, said top having a circular aperture therein; concentric hollow partition means in said container arranged concentrically thereto and with respect to said aperture, said partition means dividing the interior of said container into two compartments capable of resonance at substantially the same frequency when excited by a vacuum tube operatively arranged within said inner compartment, said partition means comprising spaced coaxial outer and inner hollow conductors of different lengths connected together at one end, the outer conductor being secured at its other end to the top of said container and suspended therefrom, said inner hollow conductor being relatively short and forming a reentrant rim defining an axially disposed passage leading from said circular aperture and passing longitudinally through both conductors, said partition being constructed and arranged to provide feedback coupling between said compartments; a vacuum tube of stepped formation having a cathode, an anode and a control grid with a ring connector terminal associated with each of said electrodes, said tube being axially accommodated within the aforesaid passage in spaced coaxial relation with respect to said outer hollow conductor whereby said inner compartment shall form a grid-cathode resonator cavity, the anode section of said tube including the anode ring terminal projecting into and located wholly within the space constituting said outer compartment to form the anode resonator cavity; individual connector means electrically connecting said cathode and grid ring terminals to said outer conductor and said rim respectively of said partition; means operatively connecting said anode ring terminal to a source of operating potential; and output means operatively arranged for removing high frequency energy from said outer compartment to convey it to a load circuit exteriorly of said container.

9. High frequency apparatus comprising a hollow container of electrically conductive material having one end closed and the other end provided with a circular aperture; removable closure means normally closing said end aperture and including a vacuum tube socket and input circuit connections thereto; a hollow cylindrical partition within said container arranged concentrically with said aperture, said partition being supported solely at one end in a suspended relation and dividing the interior of said container into two communicating compartments; a vacuum tube of stepped formation having a cathode, an anode and a control electrode, said tube being removably mounted in and suspended by said socket in an inverted position and passing coaxially through said partition, said cathode being electrically connected to said partition and to said container, and said anode and said control electrode each being electrically connected to form a circuit for high frequency energy feedback coupling between the said compartments.

10. High frequency apparatus as defined in claim 9 in which a tuning element is positioned inside of said container, said tuning element comprising a split-stator type condenser the stator plates of which are connected to said anode and said control electrode respectively while the rotor plates are free floating and have variable capacitive coupling with the stator plates.

11. Ultra high frequency apparatus having, in combination, an oscillatory circuit formed of a hollow conductor assembly comprising a hollow metallic container providing a substantially enclosed chamber closed at one end and provided at the other end with a circular aperture, two spaced coaxial tubular conductors of different lengths disposed one inside the other within said chamber, said tubular conductors being arranged concentrically relative to said circular aperture and connected together and closed at their lower ends by an annular disc, an insertible cylindrical closure plug normally closing said circular aperture in said container, said closure plug carrying a vacuum tube socket and including input circuit connections thereto, a vacuum tube having a cathode, an anode and a control electrode, said vacuum tube being of stepped formation and removably carried by said socket in an axially-disposed spaced relationship within the bores of said concentric tubes, said outer tubular conductor being secured at one end to an end wall of said container in a depending relation inside of the container, a connection from said cathode to said outer tube grounding said cathode there through to said apertured end wall of said container, a connection from said control electrode to the free end portion of said inner tube, means connecting said anode to an external source of operating potential, and a high frequency output connection from said anode to a point exteriorly of said container.

12. A high frequency oscillator comprising a hollow, closed conductive container of generally cubical shape having flat sides and ends, a hollow conductor assembly dividing the interior of said container into two compartments and comprising inner and outer concentric tubular conductors of different lengths, said conductor assembly being suspended from the underside of an end wall of said container and arranged concentrically of the container, the lower ends of said tubular conductors being connected together to form an annular closed end which is well spaced from the bottom of said container, said outer tubular conductor being provided at diametrically opposite side portions with enlarged substantially rectangular apertures to provide feed-back coupling between said compartments, a vacuum tube of stepped formation having cathode, anode and control electrodes and accommodated substantially completely within said hollow conductor assembly except for the anode section of said tube which extends into said outer compartment space, individual means for supplying operating potentials to said tube electrodes, resilient conductive means electrically connecting said cathode and control electrode to adjacent portions of said outer and inner tubular conductors respectively, and output means for removing radio frequency energy from the outer compartment through the bottom wall of said container to an exterior location for use by a utilization device.

13. A high efficiency resonant device comprising a conducting container having flat top, bottom and side walls, an incomplete windowed hollow cylindrical partition separating and dividing the interior of said container into two concentric compartments capable of resonance at substantially the same frequency, electronic tube means of stepped formation having cathode, anode and control electrodes, each of which is arranged to have electrical connection transversely of said tube enevelope with certain electrodes and corresponding conductive members bounding said compartments, the major portion of said electronic tube being concentrically arranged wholly within the inner compartment and connected for setting up standing electromagnetic waves therein, said waves penetrating the open windows in said partition for setting up a standing wave field of the same frequency in the outer compartment, and output means operatively arranged for removing high frequency energy from said outer compartment to convey it to a point exteriorly of the container for subsequent use in a utilization device.

14. As a new article of manufacture and as a partitioning member forming a component part of a cavity resonator tank circuit for use at ultra high radio frequencies, a hollow conductor assembly comprising inner and outer coaxially arranged and concentrically spaced tubular conductors of different lengths, and an annular end member secured to and electrically connecting one end of each of the conductors, the inner conductor being relatively short and defining a reentrant rim portion, the outer conductor also having an annular transverse member at the other end and the body of said outer conductor being provided diametrically thereof with relatively wide window openings, and annular electrical connector means associated with the annular transverse member of said outer conductor and said rim portion respectively for connection with the cooperating ring terminals of a lighthouse tube.

EDWIN A. JOHNSON.

REFERENCES CITED

The following references are of record in the file of this patent:

UNITED STATES PATENTS

| Number | Name | Date |
|---|---|---|
| 2,167,201 | Dallenbach | July 25, 1939 |
| 2,259,690 | Hansen et al. | Oct. 21, 1941 |
| 2,400,753 | Haeff | May 21, 1946 |